(12) United States Patent
Zha et al.

(10) Patent No.: US 12,130,983 B2
(45) Date of Patent: Oct. 29, 2024

(54) DISPLAY PANEL AND DRIVING METHOD THEREOF

(71) Applicant: Shenzhen China Star Optoelectronics Semiconductor Display Technology Co., Ltd., Shenzhen (CN)

(72) Inventors: Bao Zha, Shenzhen (CN); Zhitao Lu, Shenzhen (CN); Lei Wen, Shenzhen (CN); Jiangbo Yao, Shenzhen (CN)

(73) Assignee: Shenzhen China Star Optoelectronics Semiconductor Display Technology Co., Ltd., Shenzhen (CN)

(*) Notice: Subject to any disclaimer, the term of this patent is extended or adjusted under 35 U.S.C. 154(b) by 0 days.

(21) Appl. No.: 17/278,687

(22) PCT Filed: Jan. 29, 2021

(86) PCT No.: PCT/CN2021/074423
§ 371 (c)(1),
(2) Date: Mar. 23, 2021

(87) PCT Pub. No.: WO2022/151536
PCT Pub. Date: Jul. 21, 2022

(65) Prior Publication Data
US 2023/0341971 A1    Oct. 26, 2023

(30) Foreign Application Priority Data
Jan. 14, 2021 (CN) .......................... 202110047959.0

(51) Int. Cl.
*G06F 3/041* (2006.01)
*G09G 3/36* (2006.01)

(52) U.S. Cl.
CPC ....... *G06F 3/04166* (2019.05); *G09G 3/3677* (2013.01); *G09G 2354/00* (2013.01)

(58) Field of Classification Search
CPC .............. G06F 3/04166; G09G 3/3677; G09G 2354/00
See application file for complete search history.

(56) References Cited

U.S. PATENT DOCUMENTS

| | | | |
|---|---|---|---|
| 2010/0289788 A1 | 11/2010 | Yoshizaki | |
| 2016/0062522 A1* | 3/2016 | Yang | G06F 3/042 345/174 |
| 2020/0064967 A1* | 2/2020 | Shin | G02F 1/13338 |
| 2022/0253191 A1* | 8/2022 | Liu | G06F 3/04166 |

FOREIGN PATENT DOCUMENTS

| | | |
|---|---|---|
| CN | 1424639 A | 6/2003 |
| CN | 103728762 A | 4/2014 |
| CN | 103838046 A | 6/2014 |
| CN | 103996376 A | 8/2014 |

(Continued)

*Primary Examiner* — Stacy Khoo
(74) *Attorney, Agent, or Firm* — Nathan & Associates; Menachem Nathan

(57) ABSTRACT

The present disclosure provides a display panel and a driving method thereof. The display panel includes a substrate and a scan line, a light control device, and a display device on the substrate. The scan line is electrically connected to the light control device and the display panel, so that the light control device and the display device operate simultaneously.

14 Claims, 4 Drawing Sheets

(56) References Cited

FOREIGN PATENT DOCUMENTS

| | | | | |
|---|---|---|---|---|
| CN | 104102382 A | 10/2014 | | |
| CN | 106095159 A | 11/2016 | | |
| CN | 107976852 A | 5/2018 | | |
| CN | 109298801 A | 2/2019 | | |
| CN | 109669575 A | 4/2019 | | |
| CN | 110825269 A | 2/2020 | | |
| CN | 111290652 A | 6/2020 | | |
| IN | 104850268 A | 8/2015 | | |
| JP | 2006079589 A | * | 3/2006 | ........... G06F 3/0412 |
| WO | WO-2020220302 A1 | * | 11/2020 | ......... G02F 1/13338 |

* cited by examiner

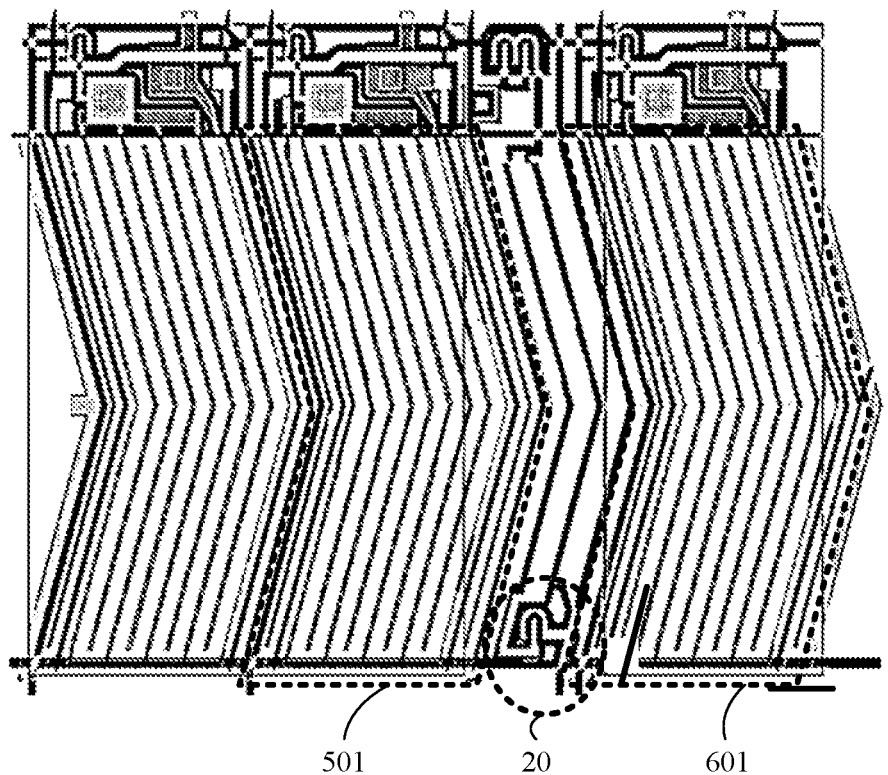

| Each multiplexing electrode of the plurality of multiplexing electrodes is used as a common electrode during a first time period, and the common electrode is driven to control the display panel to display image | S1 |

| Each multiplexing electrode of the plurality of multiplexing electrodes is used as a touch electrode during a second time period, and the touch electrode is driven to receive a touch driving signal. | S2 |

FIG. 6

DISPLAY PANEL AND DRIVING METHOD THEREOF

BACKGROUND OF INVENTION

Field of Invention

The present disclosure relates to the field of display technology and more particularly to manufacturing of display devices, and specifically to a display panel and a driving method thereof.

Description of Prior Art

With rapid development of light control technology, display panels with light control function that combines photosensitive technology and display technology have emerged.

In prior art, different scan lines are usually adopted to scan a light control device and a display device, respectively. That is to say, the light control device and the display device need to operate under control of corresponding scan lines, resulting in a sharp increase in costs of lines and driving circuit design in the display panels.

Therefore, it is necessary to provide a display panel and a driving method thereof to reduce costs of lines and driving circuit design in the display panels.

SUMMARY OF INVENTION

It is an object of the present disclosure to provide a display panel and a driving method thereof. Through electrically connecting a scan line to a light control device and a display device, the scan line can drive the light control device and the display device to operate at the same time, which solves the problem that the costs of the lines and the driving circuit design in the display panel in the prior art is relatively high.

An embodiment of the present disclosure provides a display panel, wherein the display panel comprises a substrate and a scan line, a light control device and a display device on the substrate, and the scan line is electrically connected to the light control device and the display device, so that the light control device and the display device operate simultaneously;

Wherein the light control device comprises a photosensitive thin film transistor and a switching thin film transistor electrically connected to each other, the display device comprises a display thin film transistor, and the scan line is connected to the switching thin film transistor and the display thin film transistor;

Wherein the display panel further comprises a plurality of multiplexing electrodes on the substrate, and the scan line, the light control device and the display device is disposed at a side of the substrate close to the plurality of multiplexing electrodes; each multiplexing electrode of the plurality of multiplexing electrodes is used as a common electrode during a first time period, each multiplexing electrode of the plurality of multiplexing electrodes is used as a touch electrode during a second time period, and the first time period does not overlap the second time period.

In an embodiment, the photosensitive thin film transistor, the switching thin film transistor and the display thin film transistor are disposed in a same layer.

In an embodiment, the display panel further comprises:
A photosensitive reading line electrically connected to the switching thin film transistor.

In an embodiment, the display panel further comprises:
A conductive portion disposed on the light control device and connected to the photosensitive reading line;
A conductive connection portion, wherein two ends of the conductive connection portion are connected to the conductive portion and the switching thin film transistor, respectively.

In an embodiment, each multiplexing electrode of the plurality of multiplexing electrodes further outputs a touch signal to a touch driving circuit through the connection and the metal portion during a third time period, so that the touch driving circuit determines a positon of a touch point, wherein the third time period is different from the first time period and the second time period.

In an embodiment, the display panel further comprises:
A plurality of metal portions disposed at a side of the plurality of multiplexing electrodes close to the substrate, wherein the plurality of metal portions correspond to the plurality of multiplexing electrodes one-to-one;
A plurality of connection portions, the plurality of connection portions correspond to the plurality of multiplexing electrodes one-to-one, and two ends of each connection portion of the plurality of connection portions are connected to a corresponding multiplexing electrode and a corresponding metal portion, respectively, to electrically connect the corresponding multiplexing electrode to the corresponding metal portion.

The embodiment of the present disclosure further provides another display panel, the display panel comprises a substrate and a scan line, a light control device and a display device on the substrate, and the scan line is electrically connected to the light control device and the display device, so that the light control device and the display device operate simultaneously.

In an embodiment, the light control device comprises a photosensitive thin film transistor and a switching thin film transistor electrically connected to each other, the display device comprises a display thin film transistor, and the scan line is connected to the switching thin film transistor and the display thin film transistor.

In an embodiment, the photosensitive thin film transistor, the switching thin film transistor and the display thin film transistor are disposed in a same layer.

In an embodiment, the display panel further comprises:
A photosensitive reading line electrically connected to the switching thin film transistor.

In an embodiment, the display panel further comprises:
A conductive portion disposed on the light control device and connected to the photosensitive reading line;
A conductive connection portion, wherein two ends of the conductive connection portion are connected to the conductive portion and the switching thin film transistor, respectively.

In an embodiment, the display panel further comprises a plurality of multiplexing electrodes on the substrate, and the scan line, the light control device and the display device is disposed at a side of the substrate close to the plurality of multiplexing electrodes; wherein, In an embodiment, each multiplexing electrode of the plurality of multiplexing electrodes is used as a common electrode during a first time period, each multiplexing electrode of the plurality of multiplexing electrodes is used as a touch electrode during a second time period, and the first time period does not overlap the second time period.

In an embodiment, each multiplexing electrode of the plurality of multiplexing electrodes further outputs a touch signal to a touch driving circuit through the connection and the metal portion during a third time period, so that the touch driving circuit determines a positon of a touch point, wherein the third time period is different from the first time period and the second time period.

In an embodiment, the display panel further comprises:

A plurality of metal portions disposed at a side of the plurality of multiplexing electrodes close to the substrate, wherein the plurality of metal portions correspond to the plurality of multiplexing electrodes one-to-one;

A plurality of connection portions, the plurality of connection portions correspond to the plurality of multiplexing electrodes one-to-one, and two ends of each connection portion of the plurality of connection portions are connected to a corresponding multiplexing electrode and a corresponding metal portion, respectively, to electrically connect the corresponding multiplexing electrode to the corresponding metal portion.

The embodiment of the present disclosure provides a driving method of a display panel, the driving method is suitable for the display panel according to any one of above, and the driving method comprises:

Driving the scan line to drive the light control device and the display device to operate simultaneously.

In an embodiment, the display panel further comprises a plurality of multiplexing electrodes, and the driving method further comprises:

Each multiplexing electrode of the plurality of multiplexing electrodes is used as a common electrode during a first time period, and the common electrode is driven to control the display panel to display image; and Each multiplexing electrode of the plurality of multiplexing electrodes is used as a touch electrode during a second time period, and the touch electrode is driven to receive a touch driving signal.

The present disclosure provides a display panel and a driving method thereof. The display panel comprises a scan line, a light control device, and a display device, and the scan line, the light control device, and the display device are electrically connected, so that the light control device and the display device operate simultaneously. In the scheme, the scan line can drive the light control device and the display device to operate simultaneously, and that is, no additional scan line is required to drive the light control device, and no additional time is needed to drive the light control device, and thus the scheme saves the costs of the lines and the driving circuit design and improves refresh rate and reporting rate of the display panel.

DESCRIPTION OF DRAWINGS

The technical solution and other beneficial effects of the present disclosure will be apparent from the following detailed description of specific embodiments thereof, taken in conjunction with the accompanying drawings.

FIG. 5 is a schematic top view of some areas of the display panel according to an embodiment of the present disclosure.

FIG. 6 is a flowchart of a driving method of the display panel according to an embodiment of the present disclosure.

DETAILED DESCRIPTION OF PREFERRED EMBODIMENTS

Figure 1:
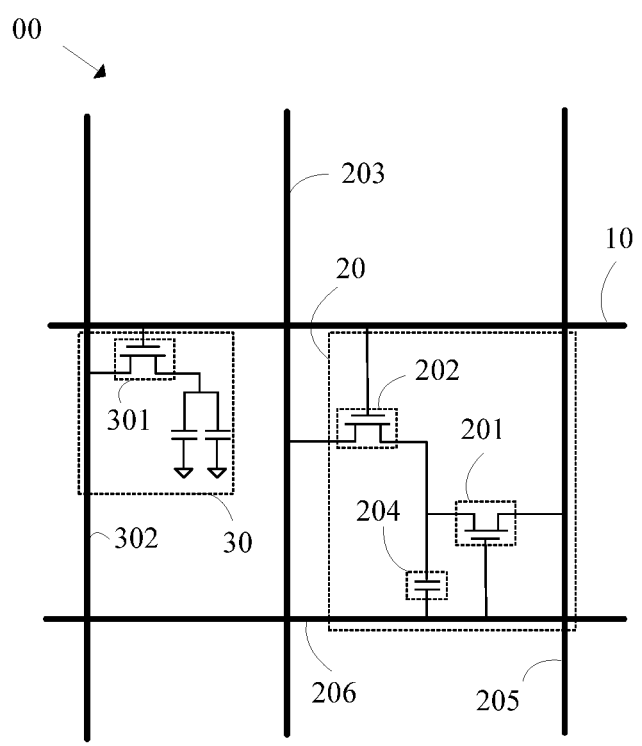
FIG. 1 is a schematic diagram of a circuit of a display panel according to an embodiment of the present disclosure.

In the description of the present disclosure, it should be understood that the orientation or positional relationship indicated by the terms "upper", "near", "far away", "row", "column", etc. are based on the orientation or positional relationship shown in the drawings. The upper position or positional relationship is only for the convenience of describing the present disclosure and simplifying the description, rather than indicating or implying that the pointed device or element must have a specific orientation, be constructed and operated in a specific orientation, and therefore cannot be understood as a limitation of the present disclosure. In addition, the terms "first", "second", etc. are only used for descriptive purposes, and cannot be understood as indicating or implying relative importance or implicitly indicating the number of indicated technical features. Therefore, the features defined with "first" and "second" may explicitly or implicitly include one or more of the features. In the description of the present disclosure, "multiple" means two or more. Unless otherwise specifically defined, "electrically connected" means that the two are electrically connected, and are not limited to direct connection or indirect connection.

In addition, it should be noted that the drawings provide only structures and steps in close relation to the present disclosure, and that details not substantially related to the disclosure are omitted in order to simplify the drawings and make the disclosure point clear, rather than indicating that the apparatus in practice is the same as those in the drawings and is not intended to be limiting of the apparatus in practice.

The present disclosure provides a display panel including, but is not limited to, the following embodiments.

Figure 3:
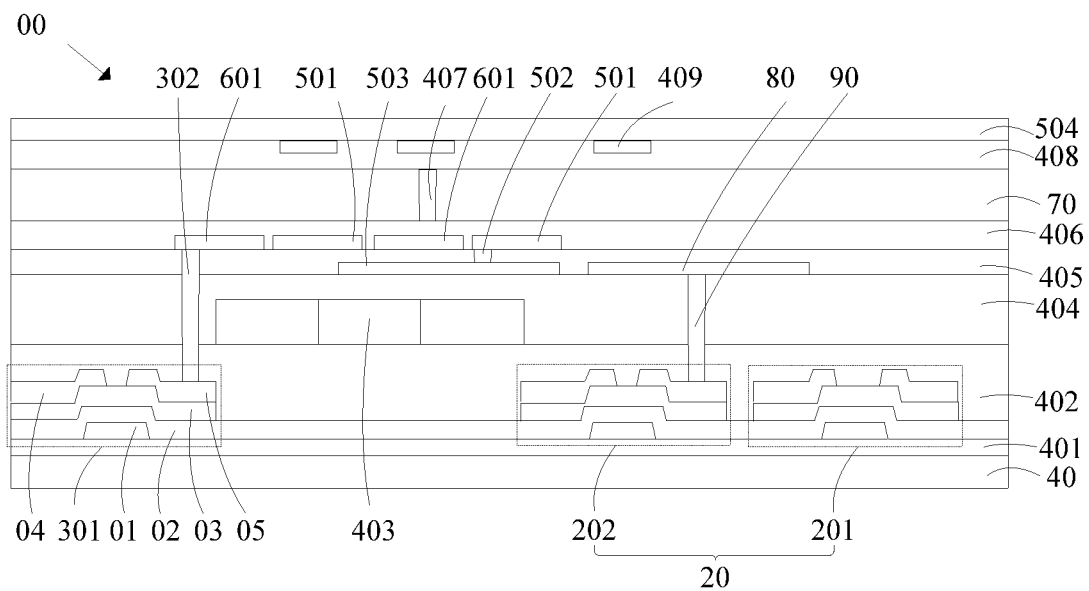
FIG. 3 is a schematic cross-sectional view of the display panel according to an embodiment of the present disclosure.

In one embodiment, as shown in FIGS. 1 and 3, the display panel 00 comprises a substrate 40, and a scan line 10, a light control device 20, and a display device 30 disposed on the substrate 40. The scan line 10, the light control device 20, and the display device 30 are electrically connected, so that the light control device 20 and the display device 30 operate simultaneously.

It should be noted that the number of the light control devices 20 and the display devices 30 are both greater than 1, and the light control devices 20 and the display devices 30 may be in a corresponding relationship or a non-corresponding relationship. Here, only a one-to-one corresponding relationship between the light control devices 20 and the display devices 30 is described as an example.

It can be understood that, the scan line 10 is electrically connected with the light control device 20 and the display device 30, i.e., the scan line 10 can transmit corresponding scan signals to the light control device 20 and the display device 30 at the same time to simultaneously control the light control device 20 and the display device 30 to operate. This embodiment can prevent setting two scan lines electrically connected to the light control device 20 and the display device 30 respectively. In other words, on the basis of driving the display device 30 by one scan line, no additional scan line is required to drive the light control device 20, and no additional time is needed to drive the light control device. This embodiment saves the costs of lines and driving circuit design and improves refresh rate and reporting rate of the display panel 00.

Figure 2:
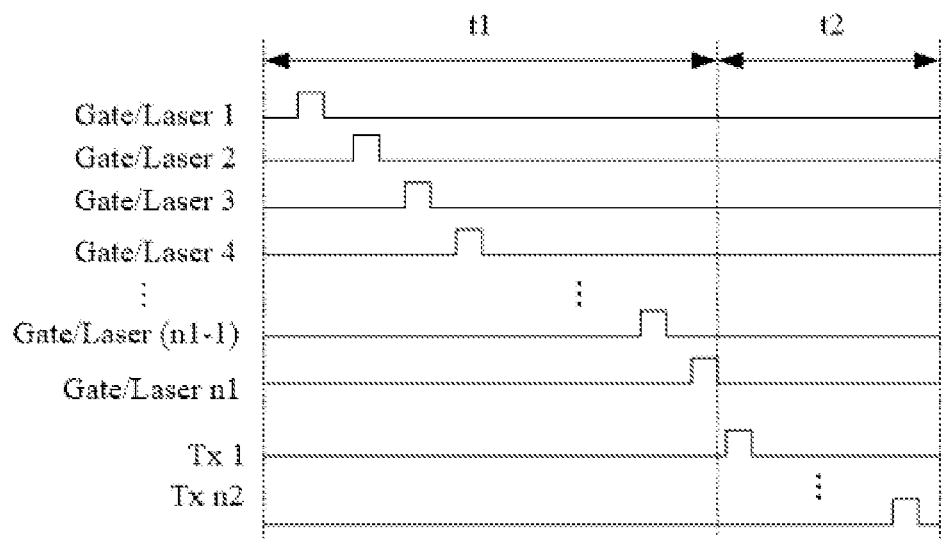
FIG. 2 is a waveform diagram of different scan signals in the display panel according to an embodiment of the present disclosure.

Further, the display panel 00 may comprise a plurality of light control devices 20, a plurality of display devices 30, and a plurality of scan lines 10. For example, the plurality of light control devices 20 and the plurality of display devices 30 may be repeatedly arranged in rows and columns in a manner shown in FIG. 1, i.e., a matrix is repeatedly arranged in rows and columns in which a combination of the light control device 20 and the display device 30 is a minimum unit, wherein, the plurality of light control devices 20 and the plurality of display devices 30 arranged in a same line share a corresponding scan line 10. Specifically, the scan line 10 may transmit a display/light control scan signal Gate/Laser to the plurality of light control devices 20 and the plurality of display devices 30 in the same line, so that the light control devices 20 and the display devices 30 receive the same display/light control scan signal Gate/Laser. Assuming that the display panel 00 comprises n1 lines of the light control devices 20 and the display devices 30, then as shown in FIG. 2, for any of the plurality of light control device 20 or display device 30 in an i-th line, a pulse of a display/light control scan signal Gate/Laser (i+1) transmitted to a plurality of light control devices 20 and display devices 30 in a (i+1) line is delayed by a duration of a pulse compared with a pulse of a display/light control scan signal Gate/Laser i transmitted to a plurality of light control devices 20 and display devices 30 in an ith line. According to the above-mentioned analysis, it can be known that the plurality of light control devices 20 and the plurality of display devices 30 in a same line operate simultaneously. Wherein, a total time required for the plurality of the light control devices 20 and the plurality of display devices 30 in the display panel 00 to complete operations is t1, and a corresponding frequency of scanning the plurality of light control devices 20 and a corresponding frequency of scanning the plurality of display devices 30 are both 1/t. It should be noted that the duration of the pulse can be understood as a time period during which the plurality of light control devices 20 and the plurality of display devices 30 in any line of the n1 lines of the light control devices 20 and the display devices 30 are operated.

In an embodiment, as shown in FIG. 1, the light control device 20 comprises a photosensitive thin film transistor 201 and a switching thin film transistor 202 electrically connected to each other, and the display device 30 comprises a display thin film transistor 301. The scan line 10 is connected with the switching thin film transistor 202 and the display thin film transistor 301. Specifically, the display device 30 further comprises a data line 302. The display panel 00 further comprises a pixel electrode 601 arranged opposite and electrically connected to the display thin film transistor 301, and a signal in the scan line 10 can control the pixel electrode 601 to obtain a signal in the data line 302 through the display device 30. The photosensitive thin film transistor 201 is configured to perceive external light and generate a photoelectric signal, and the scan line 10 can also control the photosensitive thin film transistor 201 to obtain the photoelectric signal through the switching thin film transistor 202.

In an embodiment, as shown in FIG. 3, the photosensitive thin film transistor 201, the switching thin film transistor 202 and the display thin film transistor 301 are disposed in a same layer. Specifically, the display thin film transistor 301 may comprise a gate 01, a gate insulating layer 02 covering the gate 01, an active layer 03 disposed on the gate insulating layer 02, and a source 04 and a drain 05 disposed in contact with left and right sides of the active layer 03. Specifically, one end of a pixel connection portion 302 in the display panel 00 is connected to the drain 05 and the other end of the pixel connection portion 302 is connected to the pixel electrode 601, such that the drain 05 and the pixel electrode 601 are electrically connected. Wherein, the component materials of the active layer 03 may comprise at least one of hydrogenated amorphous silicon, germanium, or a mixture of germanium and silicon. Wherein, structures of the photosensitive thin film transistor 201 and the switching thin film transistor 202 may be same with a structure of the display thin film transistor 301. In addition, the photosensitive thin film transistor 201, the switching thin film transistor 202, and the display thin film transistor 301 may be manufactured simultaneously. For example, gates of the three may be manufactured simultaneously, and gate insulating layers of the three may be also manufactured simultaneously.

In an embodiment, as shown in FIG. 1, the display panel 00 further comprises a photosensitive reading line 203 electrically connected to the switching thin film transistor 202. Wherein, the photosensitive reading line 203 may receive the photoelectric signal through the switching thin film transistor 202. Specifically, the light control device 20 further comprises a storage capacitor 204, a first voltage line 205, and a second voltage line 206. The gate and a drain of the photosensitive thin film transistor 201 are electrically connected to the second voltage line 206 and the first voltage line 205, respectively, and the second voltage line 206 and the first voltage line 205 transmit corresponding operating voltages to the gate and the drain, respectively, so that the photosensitive thin film transistor 201 is in an operational state and can perceive external light and generate the photoelectric signal in a source. Wherein, signals transmitted in the second voltage line 206 and the first voltage line 205 are both constant voltage signals. Two ends of the storage capacitor 204 are electrically connected to the source of the photosensitive thin film transistor 201 and the second voltage line 206, respectively, and the storage capacitor 204 is configured to store the photoelectric signal. The gate of the switching thin film transistor 202 is electrically connected to the scan line 10, and the signal in the scan line 10 enables the photosensitive reading line 203 to receive the photoelectric signal stored in the storage capacitor 204 through the switching thin film transistor 202 when the switching thin film transistor 202 turns on. Wherein, when number of the thin film transistors in the light control device 20 is 2, 3, 4 or 5, a 2T1C, 3T1C, 4T1C, or 5T1C circuit structure is formed with the storage capacitor 204, respectively. Wherein, a light band of the photosensitive thin film transistor 201 in the light control device 20 may comprise visible light with a wavelength of 380 nm-780 nm or infrared light with a wavelength of 780 nm-1000 nm.

In an embodiment, as shown in FIG. 3, the display panel further comprises a conductive portion 80 and a conductive connection portion 90. The conductive portion 80 is disposed on the light control device 20 and connected to the photosensitive reading line 203, and two ends of the conductive connection portion 90 are connected to the conductive portion 80 and the switching thin film transistor 202, respectively. Specifically, as shown in FIG. 1, according to the above-mentioned connection relationship, the photosensitive reading line 203 may be electrically connected to the switching thin film transistor 202 through the conductive portion 80 and the conductive connection portion 90 in sequence. In addition, the photosensitive reading line 203 may be disposed in a same layer as the conductive portion 80. Further, a plurality of photosensitive reading lines 203 may connect external circuits to transmit corresponding photosensitive reading signals.

In an embodiment, as shown in FIG. 3, the display panel 00 further comprises a plurality of multiplexing electrodes 501, and the scan line 10, the light control device 20, and the display device 30 are disposed at a side of the substrate 40 close to the plurality of multiplexing electrodes 501. Wherein, each of the plurality of multiplexing electrodes 501 is used as a common electrode in a first time period, and each of the plurality of multiplexing electrodes 501 is used as a touch electrode in a second time period, and the first time period does not overlap the second time period. Specifically, the plurality of multiplexing electrodes 501 have first signals in the first time period and second signals in the second time period, wherein the first signals are different from the second signals.

Wherein, the substrate 40 is insulating and may be a hard substrate or a flexible substrate. The hard substrate may be a glass substrate, and component materials of the glass substrate may comprise at least one of quartz powder, strontium carbonate, barium carbonate, boric acid, boric anhydride, aluminum oxide, calcium carbonate, barium nitrate, magnesium oxide, tin oxide, or zinc oxide. The flexible substrate may be a polymer substrate, which may be at least one of polyethylene, polypropylene, polystyrene, polyethylene terephthalate, polyethylene terephthalate, or polyimide.

It can be understood that, the plurality of complexing electrodes 501 may transmit different signals during different time periods to perform different operations in order to save the costs of lines and simplify manufacturing process. For example, a continuous film layer may be formed first, and then the continuous film layer is patterned to form the plurality of multiplexing electrodes 501. Wherein, component materials of the continuous film layer and the plurality of multiplexing electrodes 501 may comprise indium tin oxide. Further, as shown in FIG. 3, the display panel 00 further comprises a plurality of metal portions 503 and a plurality of connection portions 502, wherein the plurality of metal portions 503 are disposed at a side of the plurality of the multiplexing electrodes 501 close to the substrate 40 and correspond to the plurality of multiplexing electrodes 501 in a one-to-one manner, and the plurality of the connection portions 502 correspond to the plurality of multiplexing electrodes 501 in a one-to-one manner, and two ends of each of the plurality of connection portions 502 are respectively connected to the corresponding multiplexing electrode 501 and the corresponding metal portion 503 to electrically connect the corresponding multiplexing electrode 501 with the corresponding metal portion 503. Each of the metal portions 503 is electrically connected to a corresponding driving circuit, so that the corresponding multiplexing electrode 501 has the first signal, the second signal, or other signals. Wherein, the conductive portion 80 may be disposed on a same layer as the metal portions 503. In addition, component materials of the conductive portion 80 may be same as component materials of the metal portions 503, such as conductive metal materials, and therefore the conductive portion 80 may be manufactured simultaneously with the metal portions 503.

Specifically, each of the plurality of multiplexing electrodes 501 is used as a common electrode in the first time period, and a voltage difference between the common electrode and the pixel electrode 601 is used to control image display of the display panel. Wherein, the display panel 00 may be a liquid crystal display panel or an organic electroluminescent display panel. Here, the display panel 00 may be a liquid crystal display panel as an example for description. As shown in FIG. 3, the display panel 00 further comprises a liquid crystal layer 70 disposed at a side of the plurality of multiplexing electrodes 501 away from the substrate 40, and the pixel electrode 601 may be electrically connected to the display device 30 to obtain a corresponding pixel voltage. It can be understood that since the display panel 00 comprises a plurality of display devices 30, the display panel 00 further comprises a plurality of pixel electrodes 601 corresponding to the plurality of display devices 30. Wherein, the plurality of pixels 601 may be disposed in a same layer as the plurality of multiplexing electrodes 501. In addition, the plurality of pixel electrodes 601 may be arranged alternately with the plurality of multiplexing electrodes 501, and component materials of the plurality of pixel electrodes 601 may be same as component materials of the plurality of multiplexing electrodes 501. With reference to the above-mentioned descriptions, for example, a continuous film layer may be formed first, and the continuous film layer is patterned to form the plurality of multiplexing electrodes 501 and the plurality of pixel electrodes 601. Wherein, the component materials of the continuous film layer, the plurality of multiplexing electrodes 501, and the plurality of pixel electrodes 601 may comprise indium tin oxide.

It can be understood that during the first time period, each of the plurality of multiplexing electrodes 501 is used as a common electrode, i.e., each of the multiplexing electrodes 501 obtains the first signal through the connection portion 502 and the metal portion 503. In addition, the first signal may be a constant voltage signal. At this time, a voltage difference exists between each of the pixel electrodes 601 and at least one corresponding common electrode, and the voltage difference generates a lateral electric field to drive liquid crystal molecules in the liquid crystal layer 70 to deflect, thereby controlling image display of the display panel 00. Specifically, the plurality of multiplexing electrodes 501 may correspond to the plurality of display thin film transistors 301 in a one-to-one manner. As shown in FIG. 1, the data line 302 may be electrically connected to one of the source or the drain of the display thin film transistor 301. As shown in FIG. 3, the multiplexing electrode 501 may be electrically connected to the other of the source or the drain of the display thin film transistor 301. When the signal in the scan line 10 enables the display thin film transistor 301 to turn on during the first time period, a data signal in the data line 302 reaches the pixel electrode 601 through the source and the drain of the display thin film transistor 301, and after the pixel electrode 601 is loaded with the data signal, a horizontal electric field for driving the liquid crystal molecules to rotate is formed between the pixel electrode 601 and at least one corresponding multiplexing electrode 501. It should be noted that, relative positional relationship of the plurality of multiplexing electrodes 501 and the plurality of pixel electrodes 601 in the liquid crystal display panel is not limited, i.e., a display mode of the liquid crystal display panel may be in-plane switching (IPS), advanced super dimension switching (ADS), or fringe field switching (FFS).

Specifically, assuming that the display panel 00 comprises n1 lines of the light control devices 20, the display devices 30, and the multiplexing electrodes 501. As shown in FIG. 2, for example, during the first time period t1 in a frame, the multiplexing electrodes 501 all have the first signals to be used as the common electrodes. On this basis, n1 lines of the light control devices 20 and the display devices 30 may operate in sequence according to a time period of a pulse in the corresponding scan signal. Please refer to the description of FIG. 2 above for details. At the same time, the multiplexing electrodes 501 are not used as the touch electrodes, and thus touch operation is suspended in the display panel 00.

Figure 4:
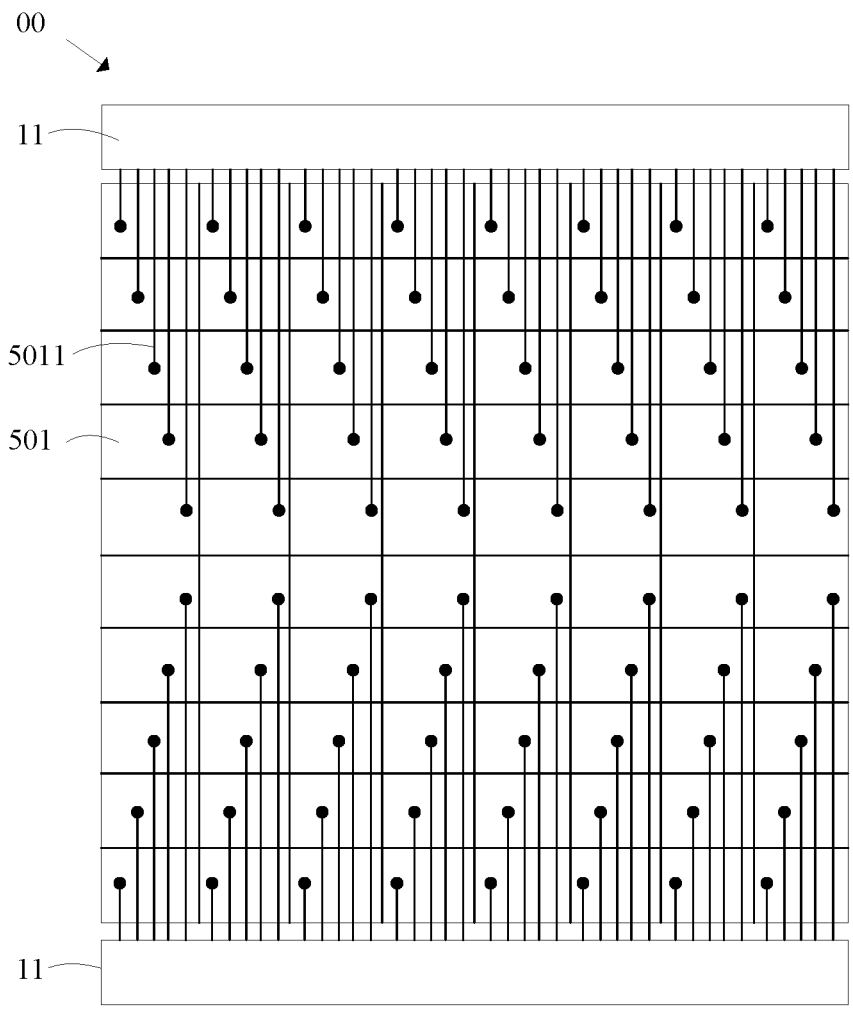
FIG. 4 is a schematic top view of the display panel according to an embodiment of the present disclosure.

Specifically, each of the plurality of multiplexing electrodes 501 is used as the touch electrode in the second time period, and the touch electrode is used to obtain a touch driving signal. Specifically, as shown in FIG. 4, the plurality of multiplexing electrodes 501 are arranged in array to realize a touch function in self-capacitance touch sensing manner of point scanning. Wherein, each of the multiplexing electrodes 501 is electrically connected to a touch driving circuit 11 through a corresponding line 5011, and each of the touch driving circuits 11 may drive parts of the multiplexing electrodes 501 through corresponding parts of the lines 5011. For example, a length of a display area of the display panel 00 is a, and a width is b, and the plurality of multiplexing electrodes 501 are arranged in an m*n array, wherein n columns of the multiplexing electrodes 501 are disposed in a length direction of the display area of the display panel 00, and m lines of multiplexing electrodes 501 are disposed in a width direction of the display area of the display panel 00. In addition, wherein (a/n) may be not greater than 7 mm, and (b/m) is not greater than 7 mm. According to the description above, as shown in FIG. 3, the pixel electrode 601 is disposed between two adjacent multiplexing electrodes 501.

Specifically, also assuming that the display panel 00 comprises n1 lines of the light control devices 20 and the display devices 30 and n2 the multiplexing electrodes 501. As shown in FIG. 2, for example, during the second time period t2 in a frame, no pulse exists in the scan signals corresponding to the n1 lines of the light control devices 20 and the display devices 30, i.e., n1 lines of the light control devices 20 and the display devices 30 are suspended. At the same time, the multiplexing electrodes 501 are used as touch electrodes, and each of the multiplexing electrodes 501 obtains the second signal through the connection portion 502 and the metal portion 503. The second signals may comprise a plurality of touch scan signals, and the plurality of touch scan signals correspond with the plurality of multiplexing electrodes in a one-to-one manner. Specifically, for example, a pulse in an (i+1)-th touch scan signal Tx(i+1) transmitted to the (i+1)-th touch electrode is delayed by the duration of a pulse compared to a pulse in an i-th touch scan signal Tx i transmitted to the i-th touch electrode. That is to say, the n2 touch electrodes may operate sequentially according to the time periods of the pulses in the corresponding touch scan signals, wherein the second time period t2 is later than the first time period t1.

According to analysis above, a total time at which the plurality of the touch electrodes in the display panel 00 are all completed is t2, and a corresponding frequency of scanning the plurality of touch electrodes is 1/t2. It should be noted that, a duration of a pulse can be considered as a time period during which any one of the touch electrodes operate. It is understandable that, a total time at which the plurality of light control devices 20, the plurality of display devices 30, and the plurality of touch electrodes in the display panel 00 in a frame are all completed is (t1+t2), and a corresponding frequency is 1/(t1+t2).

Further, as shown in FIG. 4, the plurality of multiplexing electrodes 501 may also output touch signals to the touch driving circuits 11 through the connection portions 502 and the metal portions 503 during a third time period, so that the touch driving circuits 11 determine a position of a touch point. The third time period is different from the first time period and the second time period. For example, when the multiplexing electrode 501 is touched by a finger, the multiplexing electrode 501 and the ground forms two poles of a capacitor after the multiplexing electrode 501 is coupled with the finger, which is equivalent of a providing a capacitor in series, and corresponding capacitance value will increase. Capacitance changes of each multiplexing electrode 501 is read by the touch driving circuits 11, thereby determining coordinates of the touch point.

In summary, on the one hand, the present embodiment adapts the self-capacitance touch sensing manner of point scanning, which can reduce a phenomenon of "ghost point" compared to a traditional self-capacitance sensor. On the other hand, each of the plurality of multiplexing electrodes 501 is used as the common electrode and the touch electrode during the first time period and the second time period, respectively, so that the display panel 00 performs the function of liquid crystal deflection conversion and touching during the first time period and the second time period, respectively. This embodiment improves reliability of operation of the display device 30 and the touch electrode in the display panel 00.

Specifically, as shown in FIG. 5, the multiplexing electrodes 501 and the pixel electrodes 601 in the display panel 00 may be arranged side by side, and further, the multiplexing electrodes 501 and the pixel electrodes 601 may be arranged complementarily. For example, a protruding portion of the multiplexing electrode 501 may be interlocked with a recessed portion of the pixel electrode 601. It can be understood that there is a gap between the adjacent multiplexing electrode 501 and the pixel electrode 601 to insulate the two. In addition, the light control device 20 may be disposed facing the gap, which can prevent external light from irradiating the light control device 20. Further, the photosensitive thin film transistor 201 and the switching thin film transistor 202 in the light control device 20 both may be arranged parallel to the pixel electrode 601. A sum of projected areas of the photosensitive thin film transistor 201 and the switching thin film transistor 202 in a vertical direction may be ($\frac{1}{16}$) to 1 of a projected area of the pixel electrode 601 in the vertical direction. Wherein, an order of the multiplexing electrode 501, the pixel electrode 601, and the light control device 20 is not limited to the order in FIG. 5.

It should be noted that, a positional relationship between different film layers in the display panel 00 in the present disclosure is not limited to the positional relationship in FIG. 3. Specifically, the display panel 00 is a liquid crystal display panel as an example for description. For example, as shown in FIG. 3, the gate insulating layer 02 of the display thin film transistor 301, the gate insulating layer of the photosensitive thin film transistor 201, and the gate insulating layer of the switching thin film transistor 202 may be connected to form a continuous gate insulating layer. The photosensitive thin film transistor 201 and the switching thin film transistor 202 may be connected in series. For example, the source of the photosensitive thin film transistor 201 may be electrically connected to the drain of the switching thin film transistor 202.

Further, as shown in FIG. 3, the display panel 00 may further comprise: a light extraction layer 401 disposed between the substrate 40 and the display thin film transistor 301, wherein the light extraction layer 401 comprises two film layers with different refractive indices that are periodically and alternately laminated to reflect light incident from an epitaxial layer and improve light extraction efficiency of LEDs; a first passivation layer 402 covering the display thin film transistor 301, the photosensitive thin film transistor 201 and the switching thin film transistor 202; a plurality of color blocks 403 on the first passivation layer 402, wherein every three adjacent color blocks 403 among the plurality of color blocks 403 may be arranged opposite to one of the pixel electrodes 601 and one of the display thin film transistors 301, and colors of the every three adjacent color blocks are different; an organic insulating layer 404 covering the plurality of color blocks 403, wherein the metal portions 503 and the conductive portion 80 are both disposed at a side of the organic insulating layer 404 away from the substrate 40; a second passivation layer 405 covering the metal portions 503 and the conductive portion 80, wherein the plurality of multiplexing electrodes 501 and the plurality of pixel electrodes 601 are disposed at a side of the second passivation layer 405 away from the substrate 40 and the connection portions 502 partly penetrate the second passivation layer 405; a first alignment layer 406 covering the plurality of multiplexing electrodes 501 and the plurality of pixel electrodes 601, wherein component materials of the first alignment layer 406 may comprise polyimide; a support pillar 407 in the liquid crystal layer 70; a second alignment layer 408 disposed at a side of the liquid crystal layer 70 away from the substrate 40; a plurality of shielding portions 409 disposed at a side of the second alignment layer 408 away from the substrate 40, wherein each of the plurality of the shielding portions 409 is disposed between two adjacent color blocks 403 of different colors; a color film substrate 504 disposed at a side of the plurality of shielding portions 409 away from the substrate 40, wherein the color film substrate is configured to sustain the plurality of shielding portions 409.

The present disclosure further comprises a driving method of a display panel, the display panel is suitable for the above-mentioned display panel, and the driving method comprises the following steps:

The scan line is driven to drive the light control device and the display device to operate simultaneously.

It can be understood that the scan line is electrically connected to the light control device and the display device, i.e., the scan line may transmit a corresponding scan signal to the light control device and the display device simultaneously to control the light control device and the display device to operate simultaneously. This embodiment can prevent setting two scan lines to electrically connect the light control device and the display device respectively, i.e., on the basis of driving the display device with one scan line, an additional scan line is not required to drive the light control device, and no additional time is required to drive the light control device; thus the present embodiment saves the costs of lines and the driving circuit design and improves the refresh rate and reporting rate of the display panel. Specifically, relevant above-mentioned descriptions may be referenced for information on the relative positional relationship of the scan line, the light control device, the display device, and signal contents transmitted in the scan line.

In an embodiment, as shown in FIG. 6, the display panel further comprises a plurality of multiplexing electrodes, and the driving method further comprises:

S1, each of the plurality of multiplexing electrodes is used as the common electrode in the first time period, and the common electrode is driven to control the display panel to display image;

S2, each of the plurality of multiplexing electrodes is used as the touch electrode to drive the touch electrode to receive the touch driving signal.

It can be understood that, the plurality of multiplexing electrodes may transmit different signals during different time periods to perform different operations, thereby reducing the costs of lines and simplifying the manufacturing process. For example, a continuous film layer may be formed first and then the continuous film layer is patterned to form the plurality of multiplexing electrodes. Wherein, component materials of the continuous film layer and the plurality of multiplexing electrodes comprise indium tin oxide. Further, as shown in FIG. 3, each of the multiplexing electrode may be electrically connected to the metal portion through the connection portion, and then the metal portion is electrically connected to the corresponding driving circuit, so that the multiplexing electrode has the first signal, the second signal, or other signals.

Specifically, assuming that the display panel comprises n1 lines of the light control devices, the display devices, and the multiplexing electrodes. As shown in FIG. 2, for example, during the first time period in a frame, the multiplexing electrodes all have the first signals to be used as the common electrodes, and on this basis, the n1 lines of the light control devices and the display devices may operate sequentially according to time periods of pulses in corresponding scan signals, the above-mentioned description of FIG. 2 above may be referenced for details. At the same time, the multiplexing electrodes are not used as the touch electrodes, and thus the touching operation is suspended in the display panel.

During the second time period t2 in a frame, no pulse exists in the scan signals corresponding to the n1 lines of the light control devices and the display devices, i.e., n1 lines of the light control devices and the display devices are suspended. At the same time, the multiplexing electrodes are used as touch electrodes, and each of the multiplexing electrodes obtains the second signal through the connection portion and the metal portion. The second signals may comprise a plurality of touch scan signals, and the plurality of touch scan signals correspond with the plurality of multiplexing electrodes in a one-to-one manner. Specifically, for example, a pulse in an (i+1)-th touch scan signal Tx(i+1) transmitted to the (i+1)-th touch electrode is delayed by the duration of a pulse compared to a pulse in an i-th touch scan signal Tx i transmitted to the i-th touch electrode. That is to say, the n2 touch electrodes may operate sequentially according to the time periods of the pulses in the corresponding touch scan signals, wherein the second time period t2 is later than the first time period t1.

According to the above-mentioned analysis, a total time required for the plurality of the touch electrodes in the display panel 00 to complete operations is t2, and a corresponding frequency of scanning the plurality of touch electrodes is 1/t2. It should be noted that, a duration of a pulse can be considered as a time period during which any one of the touch electrodes operate. It is understandable that a total time required for the plurality of light control devices, the plurality of display devices, and the plurality of touch electrodes in the display panel in a frame to complete operations is (t1+t2), and a corresponding frequency is 1/(t1+t2).

Further, the plurality of multiplexing electrodes may also output touch signals to the touch driving circuits through the connection portions and the metal portions during the third time period, so that the touch driving circuits determine a position of a touch point. The third time period is different from the first time period and the second time period. For example, when the multiplexing electrode is touched by a finger, the multiplexing electrode and the finger forms two poles of a capacitor after the multiplexing electrode is coupled with the finger, which is equivalent to a capacitor in series, and corresponding capacitance value will increase. A capacitance change of each multiplexing electrode is read by the touch driving circuits, thereby determining coordinates of the touch point.

In summary, on the one hand, the present embodiment adapts the self-capacitance touch sensing manner of point scanning, which can reduce a phenomenon of "ghost point" compared to a traditional self-capacitance sensor. On the other hand, each of the plurality of multiplexing electrodes is used as the common electrode and the touch electrode during the first time period and the second time period, respectively, so that the display panel performs the function of liquid crystal deflection conversion and touching during the first time period and the second time period, respectively. This embodiment improves reliability of operation of the display device and the touch electrode in the display panel.

The present disclosure provides a display panel and a driving method thereof, wherein the display panel comprises a scan line, a light control device, and a display device. The scan line is electrically connected to the light control device and the display device, so that the light control device and the display device operate simultaneously. In the technical solution, the scan line may drive the light control device and the display device to operate simultaneously, i.e., no additional scan line is needed to drive the light control device, and no additional time is required to drive the light control device. Thus, this technical solution saves the costs of lines and the driving circuit design, and improves the refresh rate and reporting rate of the display panel.

The structure of the display panel and the steps of the driving method thereof according to the embodiment of the present disclosure are described in detail, and the principles and embodiments of the present disclosure are described herein using specific examples. The description of the above embodiment is merely provided to help understand the technical solution and the core idea of the present disclosure. It is understood by those of ordinary skill in the art that modifications may still be made to the technical solutions described in the foregoing embodiments, or equivalents may be made to some of the technical features therein. These modifications or substitutions do not depart the essence of the corresponding technical solutions from the scope of the technical solutions of the various embodiments of the present disclosure.

What is claimed is:

1. A display panel, comprising:
  a substrate;
  a circuit, disposed on the substrate, and comprising:
    a light control device, comprising:
      a photosensitive thin film transistor; and
      a switching thin film transistor, comprising a drain electrically connected to a source of the photosensitive thin film transistor;
    a display device, comprising a display thin film transistor;
    a scan line, electrically connected to a gate of the switching thin film transistor and a gate of the display thin film transistor to enable the light control device and the display device to operate simultaneously; and
    a photosensitive reading line, electrically connected to a source of the switching thin film transistor;
  a conductive portion, disposed over the light control device and connected to the photosensitive reading line;
  a conductive connection portion, connecting the conductive portion and the switching thin film transistor;
  a plurality of multiplexing electrodes, disposed on the substrate, wherein each of the plurality of multiplexing electrodes is configured as a common electrode during a first time period and configured as a touch electrode during a second time period non-overlapped with the first time period;
  a plurality of metal portions, disposed at a side of the plurality of multiplexing electrodes close to the substrate and corresponding to the plurality of multiplexing electrodes in a one-to-one manner; and
  a plurality of connection portions, disposed corresponding to the plurality of multiplexing electrodes in a one-to-one manner, wherein two ends of each of the plurality of connection portions are connected to a corresponding multiplexing electrode of the plurality of multiplexing electrodes and a corresponding metal portion of the plurality of metal portions, respectively, to electrically connect the corresponding multiplexing electrode to the corresponding metal portion.

2. The display panel according to claim 1, wherein the photosensitive thin film transistor, the switching thin film transistor, and the display thin film transistor are disposed in a same layer.

3. The display panel according to claim 1, wherein each of the plurality of multiplexing electrodes further outputs a touch signal to a touch driving circuit through the connection and the metal portion during a third time period to enable the touch driving circuit to determine a position of a touch point, wherein the third time period is different from the first time period and the second time period.

4. The display panel according to claim 1, wherein the photosensitive thin film transistor, the switching thin film transistor, and the display thin film transistor are disposed between the substrate and the conductive portion.

5. The display panel according to claim 1, wherein a drain and a gate of the photosensitive thin film transistor are electrically connected to a first voltage line and a second voltage line, respectively.

6. The display panel according to claim 5, wherein the circuit further comprises:
  a storage capacitor, electrically connected between the source of the photosensitive thin film transistor and the second voltage line, and configured to store a photoelectric signal generated by the photosensitive thin film transistor.

7. A display panel, comprising:
  a substrate;
  a light control device, disposed on the substrate;
  a display device, disposed on the substrate;
  a scan line, electrically connected to the light control device and the display device to enable the light control device and the display device to operate simultaneously;
  a plurality of multiplexing electrodes, disposed on the substrate;
  a plurality of metal portions, disposed at a side of the plurality of multiplexing electrodes close to the substrate and corresponding to the plurality of multiplexing electrodes one-to-one; and
  a plurality of connection portions, disposed corresponding to the plurality of multiplexing electrodes one-to-one, wherein two ends of each connection portion of the plurality of connection portions are connected to a corresponding multiplexing electrode of the plurality of multiplexing electrodes and a corresponding metal portion of the plurality of metal portions, respectively, to electrically connect the corresponding multiplexing electrode to the corresponding metal portion; and wherein each of the plurality of multiplexing electrodes is configured as a common electrode during a first time period and configured as a touch electrode during a second time period, and the first time period does not overlap the second time period.

8. The display panel according to claim 7, wherein the light control device comprises a photosensitive thin film transistor and a switching thin film transistor electrically connected to each other, the display device comprises a display thin film transistor, and the scan line is connected to the switching thin film transistor and the display thin film transistor.

9. The display panel according to claim 8, wherein the photosensitive thin film transistor, the switching thin film transistor, and the display thin film transistor are disposed in a same layer.

10. The display panel according to claim 8, wherein the display panel further comprises:
a photosensitive reading line electrically connected to the switching thin film transistor.

11. The display panel according to claim 10, wherein the display panel further comprises:
a conductive portion disposed on the light control device and connected to the photosensitive reading line; and
a conductive connection portion, wherein two ends of the conductive connection portion are connected to the conductive portion and the switching thin film transistor, respectively.

12. The display panel according to claim 7, wherein the scan line, the light control device, and the display device are disposed at a side of the substrate close to the plurality of multiplexing electrodes.

13. The display panel according to claim 12, wherein each of the plurality of multiplexing electrodes further outputs a touch signal to a touch driving circuit through the connection and the metal portion during a third time period to enable the touch driving circuit to determine a position of a touch point, wherein the third time period is different from the first time period and the second time period.

14. A driving method of a display panel, wherein the driving method is suitable for the display panel comprising:
a substrate;
a light control device, disposed on the substrate;
a display device, disposed on the substrate;
a scan line, electrically connected to the light control device and the display device to enable the light control device and the display device to operate simultaneously;
a plurality of multiplexing electrodes, disposed on the substrate;
a plurality of metal portions, disposed at a side of the plurality of multiplexing electrodes close to the substrate and corresponding to the plurality of multiplexing electrodes one-to-one; and
a plurality of connection portions, disposed corresponding to the plurality of multiplexing electrodes one-to-one, wherein two ends of each connection portion of the plurality of connection portions are connected to a corresponding multiplexing electrode of the plurality of multiplexing electrodes and a corresponding metal portion of the plurality of metal portions, respectively, to electrically connect the corresponding multiplexing electrode to the corresponding metal portion; and
wherein each of the plurality of multiplexing electrodes is configured as a common electrode during a first time period and configured as a touch electrode during a second time period, and the first time period does not overlap the second time period; and
wherein the driving method comprises:
driving the scan line to drive the light control device and the display device to operate simultaneously.

* * * * *